United States Patent
Luckett et al.

(10) Patent No.: US 9,533,649 B2
(45) Date of Patent: Jan. 3, 2017

(54) SEAMLESS PASSENGER AIRBAG SYSTEM

(71) Applicant: Ford Global Technologies, LLC, Dearborn, MI (US)

(72) Inventors: Thomas Junior Luckett, Saline, MI (US); Frank Qiukui Liu, Canton, MI (US); Kenneth J. Kwasnik, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/660,047

(22) Filed: Mar. 17, 2015

(65) Prior Publication Data

US 2015/0321635 A1 Nov. 12, 2015

Related U.S. Application Data

(60) Provisional application No. 61/989,910, filed on May 7, 2014.

(51) Int. Cl.
*B60R 21/215* (2011.01)
*B62D 25/14* (2006.01)
*B60R 21/205* (2011.01)

(52) U.S. Cl.
CPC .......... *B60R 21/215* (2013.01); *B60R 21/205* (2013.01); *B62D 25/145* (2013.01); *B60R 2021/21512* (2013.01); *B60R 2021/21537* (2013.01)

(58) Field of Classification Search
CPC ................ B60R 21/215; B60R 21/205; B60R 2021/21512
USPC ..................................................... 280/728.3
See application file for complete search history.

(56) References Cited

U.S. PATENT DOCUMENTS

| | | | |
|---|---|---|---|
| 5,277,443 A | 1/1994 | Grant et al. | |
| 5,316,822 A | 5/1994 | Nishijima et al. | |
| 5,544,912 A | 8/1996 | Sommer | |
| 5,632,914 A | 5/1997 | Hagenow et al. | |
| 5,738,366 A * | 4/1998 | Phillion | B60R 21/16 280/728.2 |
| 5,806,880 A | 9/1998 | Gray | |
| 6,517,101 B1 * | 2/2003 | Bemis | B60R 21/215 280/728.3 |
| 7,571,928 B2 | 8/2009 | Soejima | |
| 7,914,039 B2 * | 3/2011 | Mazzocchi | B60R 21/205 280/728.2 |
| 7,926,842 B2 | 4/2011 | Kong | |
| 2003/0066586 A1 | 4/2003 | Blockhaus et al. | |
| 2009/0278337 A1 | 11/2009 | Springer et al. | |
| 2010/0230938 A1 * | 9/2010 | Mazzocchi | B60R 21/205 280/732 |
| 2010/0230939 A1 * | 9/2010 | Mazzocchi | B29C 44/12 280/732 |
| 2012/0223512 A1 | 9/2012 | Barr et al. | |

* cited by examiner

*Primary Examiner* — Faye M Fleming
(74) *Attorney, Agent, or Firm* — Vichit Chea; Price Heneveld LLP

(57) ABSTRACT

An airbag assembly includes a housing having a chute defining an opening. A panel is joined with the chute at a first end and extends over the opening to a second end opposite the first end and elevated with respect thereto. A substrate overlies the panel such that the elevated second end is closer to the substrate than the first end, and a foam layer extends from the substrate to the panel.

17 Claims, 5 Drawing Sheets

SEAMLESS PASSENGER AIRBAG SYSTEM

CROSS-REFERENCE TO RELATED APPLICATION

This application claims the benefit of U.S. Provisional Patent Application No. 61/989,910 filed May 7, 2014, entitled "SEAMLESS PASSENGER AIR BAG SYSTEM," which is hereby incorporated by reference in its entirety

FIELD OF THE INVENTION

The present invention generally relates to an airbag housing structure including a chute with a lid inclined to an elevated leading edge. When used in connection with a soft instrument panels with seamless passenger restraint systems where foam of the like overlies an un-deployed restraint, the structure of the lid facilitates a reduced thickness of an adjacent portion of the instrument panel over the door that may reduce and potentially eliminate instances of the soft material being projected toward an occupant during airbag deployment.

BACKGROUND OF THE INVENTION

Automotive airbag systems include an airbag module mounted within a housing that is concealed beneath a surface of the vehicle interior. In particular, passenger airbag systems may include a chute defined by the housing and extending within the dashboard of the associated vehicle. The chute may be concealed beneath a surface of the dashboard or instrument panel substrate. In such an arrangement, the passenger airbag chute door (which may also be referred to as the "roof" of the chute) extends over an opening of the airbag assembly and is supported by a portion of the housing from the airbag canister, which may include a wall of the chute. The chute door may be weakened to facilitate tearing when a threshold amount of energy is applied to the underside thereof during activation of the airbag. The adjacent portion of the dashboard or instrument panel substrate may include a pre-weakened tear line that ruptures upon airbag deployment, allowing the airbag to deploy within the chute, out of the opening thereof, and from out of the dashboard.

In applications where the chute is covered by a portion of the instrument panel, multiple layers of material may extend over the door of the chute and other areas outward thereof, such material typically being bonded with both the door and the surrounding portions of the instrument panel support structure. Such layers may include the visible, outer layer of the instrument panel as well as intermediate layers, which may include foam or the like (used for "soft touch" instrument panel structures). Some variations of these covered arrangements may be "seamless" structures in which the outermost instrument panel layer is not pre-weakened along any particular predetermined tear seam. Depending on the type of material used for the outer layer of the instrument panel, the force necessary for airbag deployment to tear the un-weakened material may be appreciably greater than pre-weakened structures or in arrangements employing weaker materials. In an example, leather instrument panels may require a particularly high level of deployment force. Accordingly, further advances in airbag chutes and related structures are desired.

SUMMARY OF THE INVENTION

According to one aspect of the present invention, an airbag assembly includes a housing having a chute defining an opening. A panel is joined with the chute at a first end and extends over the opening to a second end opposite the first end and elevated with respect thereto. A substrate overlies the panel such that the elevated second end is closer to the substrate than the first end, and a foam layer extends from the substrate to the panel.

According to another aspect of the present invention, a vehicle instrument panel includes a substrate and an airbag chute underlying the substrate with a panel coupled thereto at a first end and extending thereover to a second end. The instrument panel further includes a foam layer between the substrate and the panel that tapers from a first thickness over the first end of the panel to a second thickness over the second end of the panel, the second thickness being less than 50% of the first thickness.

According to another aspect of the present invention, an airbag housing includes a chute having a plurality of walls and defining an opening. A flange extends outwardly from the chute and generally surrounds the opening. A panel is coupled with one of the walls at a first end adjacent the flange and extends over the opening to a second end opposite the first end. The panel defines an inclined section to position and the second end at a distance above the flange.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
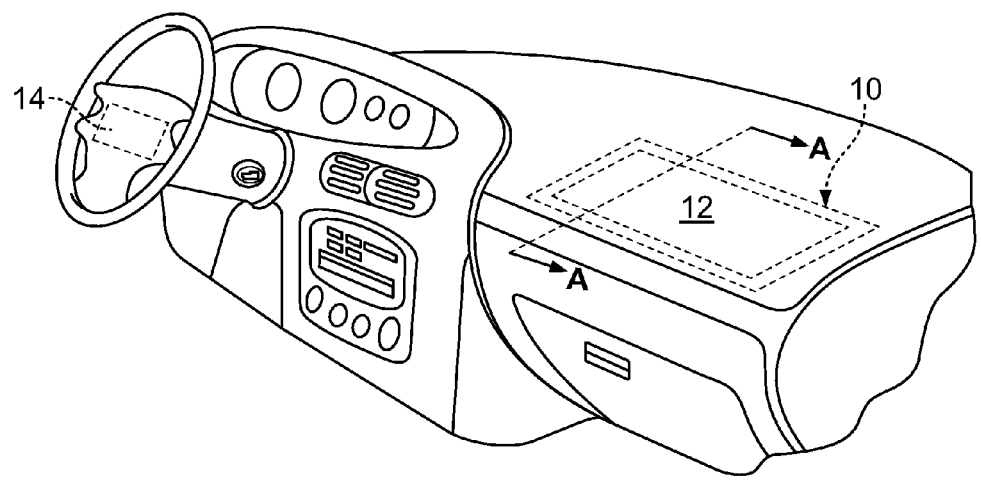
FIG. 1 is a perspective view of an interior compartment of an automobile having an airbag module and related instrument panel components.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring now to FIG. 1, an interior of an automobile is illustrated having an airbag housing 10 located proximate an instrument panel 12. In the illustrated embodiment, the airbag housing 10 is configured in a "top mount" position in which the airbag module is adjacent an upper surface of a dashboard or instrument panel 12. According to another embodiment, the airbag housing 10 could be configured in a "front mount" position in which the airbag housing 10 is positioned proximate a glove box. Additionally or alternatively, the automobile may have an airbag module, which may be suitable for use in a steering wheel airbag module 14. The airbag module may be located elsewhere in the vehicle in various embodiments.

Figure 2:
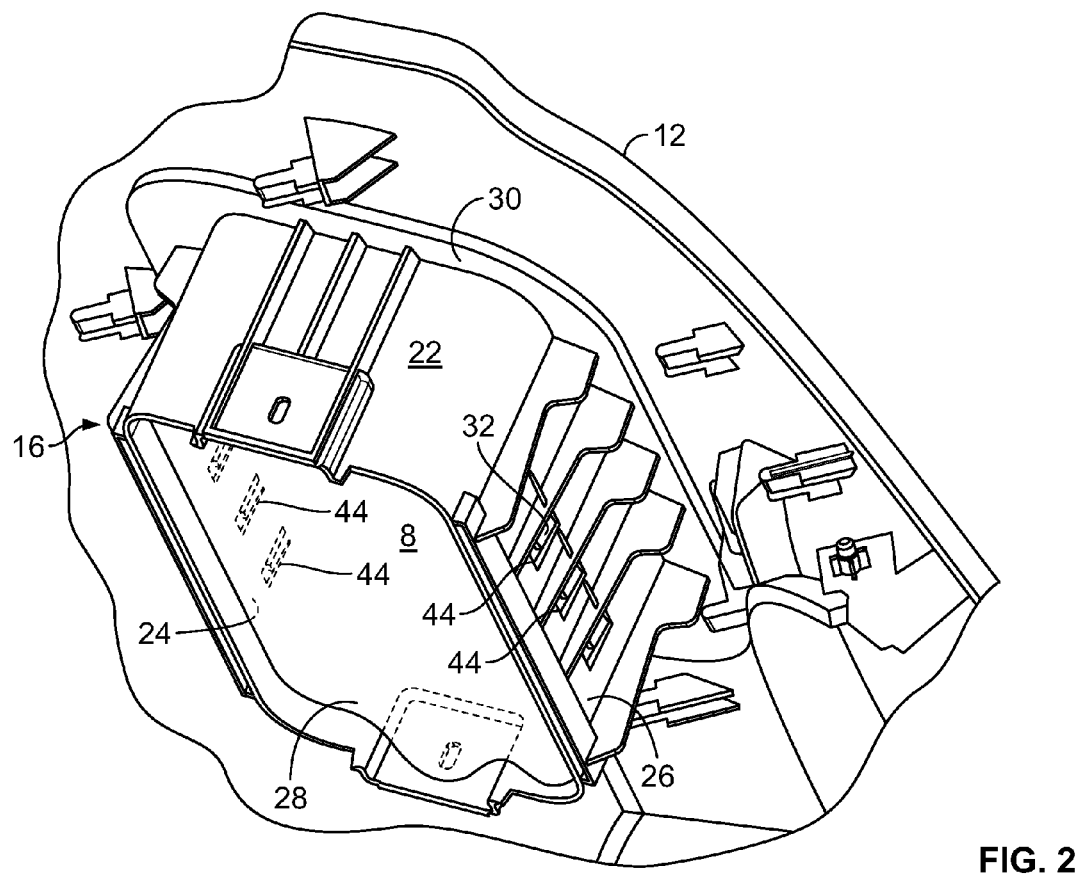
FIG. 2 is a perspective view of the airbag module and adjacent instrument panel components.
Figure 3:
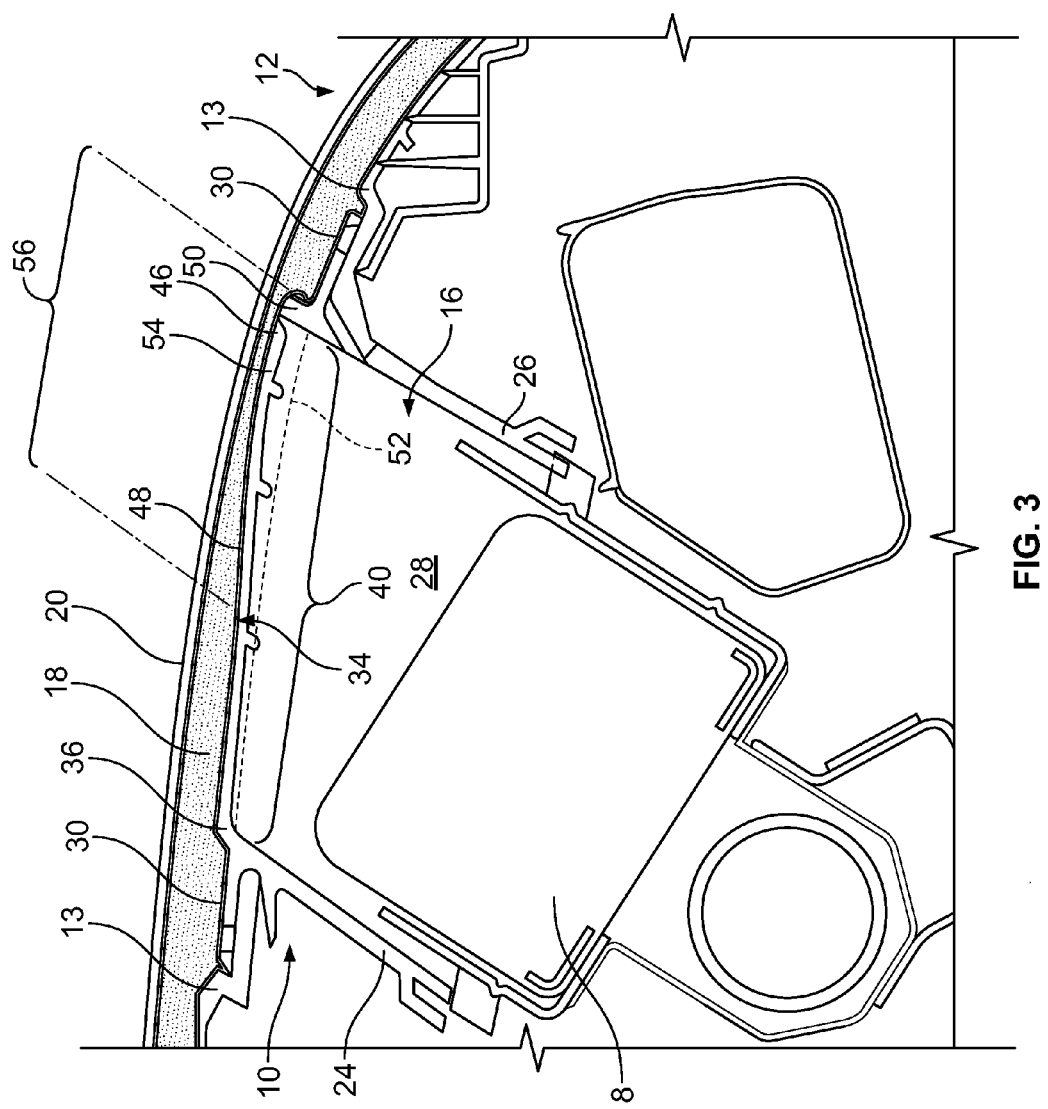
FIG. 3 is a cross-sectional perspective view is a cross-sectional view, taken along line A-A of FIG. 1, of an airbag module and associated instrument panel components according to the present disclosure.

Referring to FIGS. 2 and 3, the airbag housing 10 comprises a chute 16 for at least partially enclosing or surrounding an airbag module 8 and a chute door 34 for closing an open top end of the chute 16. The housing 10, as discussed above, can be positioned within the instrument panel 12 or steering wheel of a vehicle, for example, for mounting of airbag module 8 therein in an assembly of the two components. The housing 10 also includes a top wall in the form of a moveable chute door 34 or door that is positioned within or over an opening 40 of chute 16. A foam layer 18, of for example, polyurethane foam or other polymeric foam material, extends along a portion of the instrument panel 12 so as to support and provide a soft-touch feel for substrate 20, which comprises the outer surface of the instrument panel 12. Foam layer 18 is positioned such that a portion thereof lies atop the chute door 34 of the chute 16, with a remaining portion thereof extending outwardly over flange 30 and over the internal support structure 13 of instrument panel 12 (or at least a portion thereof). The shape of foam layer 18 and chute door 34 of the chute 16 both substantially correspond to the shape of the instrument panel substrate 20.

Chute 16 also includes a plurality of walls described as a front wall 24, a rear wall 26, and two sidewalls 22, 28 which extend downwardly from chute door 34 (or "chute roof"). The plurality of walls 22, 24, 26, and 28 together define an interior 38 of the chute 16 and surround an opening 40 of chute 16 at an upper end thereof (i.e. adjacent to chute door 34). The front and rear walls 24, 26 may each contain several window apertures 44 for engagement with a corresponding number of attachment hooks (not illustrated) extending from an airbag module 8. The window apertures 44 may have pressure tabs 32 that bear against the inserted hooks to tighten the engagement connections and prevent rattling from occurring between the airbag container and the airbag chute 16 during vehicle operation, prior to airbag deployment.

As illustrated, chute door 34 extends over at least a portion of the opening 40 so as to provide support for the portion of foam layer 18 and substrate 20 that extend thereover. An outer flange 30 can surround opening 40 and may extend integrally from near the upper end of walls 22, 24, 26, and 28. Further, chute door 34 may be somewhat smaller than opening 40 to provide for clearance or the like during airbag deployment (as discussed below) and may be detached from walls 22, 26, and 28, a hinge portion 36 attaching chute door 34 to chute 16 at wall 24 to allow opening of chute door 34 with respect to chute 16 by flexing thereof. Alternatively, chute 16 and chute door 34 may be in a fully-sealed configuration with a tear seam (e.g. a thinned or otherwise weakened boundary area) extending between chute door 34 and walls 22, 26, and 28. Still further, the chute door 34 can be sealed relative to the chute 16 by a topper (not shown) that is assembled between chute 16 (i.e. over chute door 34 and flange 30) and the overlying portion of foam layer 18. Chute door 34 may also include several apertures 44. Such apertures 44 can be positioned to reduce the mass of the chute door 34 without affecting its supporting or attachment properties.

As mentioned above, hinge 36 extends between one of the walls 22, 24, 26, or 28 of chute 16 and an edge 46 of chute door 34 adjacent to that wall to provide a flexible attachment for chute door 34 to chute 16. As shown in FIG. 3, hinge 36 may extend from a portion of front wall 24 and join with chute door 34 by extending continuously thereinto along a side 42 of chute door 34 adjacent front wall 24. Hinge 36 may be integrally formed in a single piece of material with chute 16 and may further be integrally formed with chute door 34 such that chute 16, chute door 34, and hinge 36 are of a single piece of material, which can be of a somewhat flexible material, such as a polymeric material, for example Dexflex™ or other material that exhibits a level of ductility at cold temperatures (at least to −30° C.) and acceptable toughness at high temperatures (at least to 90° C.). Other materials such as TPO (Thermoplastic Olefin), TPE (Thermoplastic Elastomer) or TEO (Thermoplastic Elastomer Olefin) may also be used. It is such material flexibility that allows chute door 34 to move with respect to chute 16 during airbag deployment, which may include flexing of hinge 36 as well as adjacent portions of chute door 34.

Figure 4:
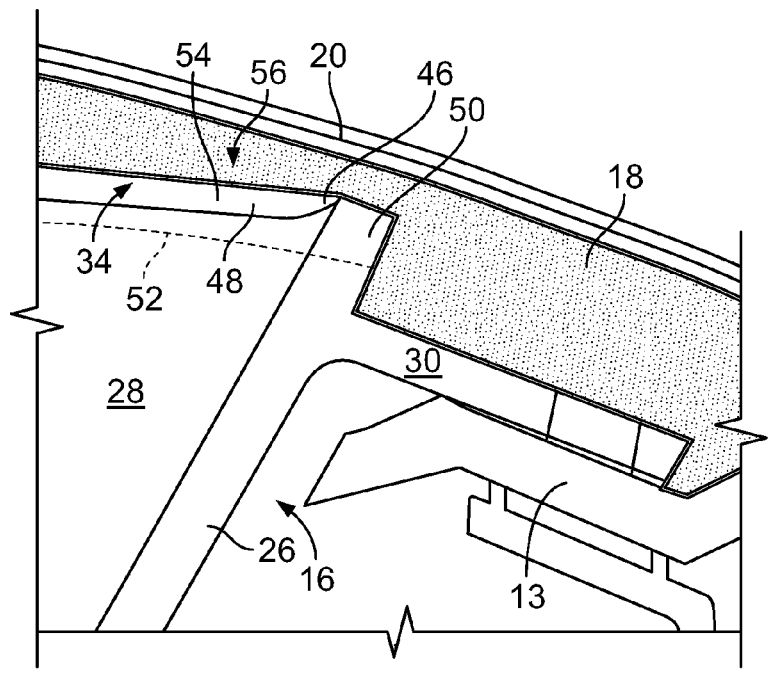
FIG. 4 is a detail view of the airbag module and instrument panel components of FIG. 3 illustrating the reduced thickness soft material.

As shown in FIGS. 3 and 4, housing 10 is configured such that a rear edge 46 of chute door 34 (which is disconnected from adjacent portions of chute 16) is positioned closer to substrate 20 than a front edge 42 of chute door 34, located at the junction (or transition) between chute door 34 and hinge 36. Thusly, chute door 34 may include a transition, or inclined area 48 to extend in a direction between front edge 42 and the elevated rear edge 46. Further, the extension achieved by inclined area 48 may be such that rear edge 46 is positioned at a greater distance from flange 30 than front edge 42, substrate 20 being spaced at a generally uniform distance above flange 30. In an example, front edge 42 may be positioned so as to be generally aligned with flange 30 or spaced above flange 30 by up to 3 mm (+/−10%). Inclined area 48, which may extend through between about 30% and 60% of the total depth of chute door 34 and may further be positioned adjacent rear edge 46, can be such that 0-4 mm of foam lay on top of chute door 34.

A chute extension 50 can extend beyond flange 30 to meet with the elevated rear edge 46 and may taper to match the angle of inclined area 48 along side walls 22 and 28. In a fully-sealed variation of housing 10 (such as described further above), chute door 34 may be joined along a tear seam with an upper edge of chute extension 50 through the sides of inclined area 48 and rear edge 46. Stated differently, both rear edge 46 and chute extension 50 can be positioned beyond flange 30 so as to extend closer to substrate 20 than the remaining portions of housing 10.

As further shown, foam layer 18 fills the space between both instrument panel support 13 and the outer portions of housing 10 that extend over airbag module 8 (i.e. flange 30, chute door 34 and any other adjacent portions of housing 10 therebetween). The majority of the instrument panel 12, and in particular, the area thereof surrounding housing 10, is configured as a generally smooth, continuous shape with foam layer 18 being of a generally uniform thickness beneath substrate 20, which it supports. Foam layer 18 may vary somewhat in thickness to compensate for various features of support 13 or imperfections and transitions therein. In the related art example shown in FIGS. 6 and 7, a variation of a chute 116 is shown where panel 134 extends generally even with flange 130 and with adjacent portions of support 113 such that foam layer 118 is of a generally uniform thickness thereover as well.

In the present embodiment of housing 10, shown in FIGS. 1-6, and with reference to FIGS. 3 and 4, in particular, the above-described structure of housing 10 with chute door 34 having an inclined portion 48 to elevated rear edge 46 adjacent a chute extension 50, foam layer 18 is reduced in thickness in the area of rear edge 46 and through a transition positioned along inclined area 48. As shown, substrate 20 is structured to be generally uniform and does not respond significantly (or visually noticeably) to the presence of inclined area 48 or elevated rear edge 46 and extension 50 due to the reduction in the thickness of foam layer 18, as indicated compared to the baseline thickness of foam layer in those areas, which is represented by a reference line in the form of baseline 52 extending generally perpendicular to front wall 24. In an embodiment, rear edge 46 of chute door 34 may be elevated relative to baseline 52 by about 5 mm (+/−10%). Such an elevation can result in, for example a reduction in the thickness of foam layer 18 from about 9 mm (measured, for example, in the area over flange 30) to between about 5 mm and about 2 mm in the area overlying edge 46 and chute extension 50 (all dimensions +/−10%). In the example shown, chute extension 50 can also be elevated above baseline 52 by between about 5 mm and about 10 mm (+/−10%) and can have a thickness of about 5 mm (+/−10%). In another example, the thickness of foam layer 18 can decrease by at least about 50% in the area of rear edge 46 compared with the thickness thereof over a portion of chute door 34 opposite inclined area 48 from rear edge 46, such as over front edge 42, and in another embodiment between about 50% and about 80%.

Chute door 34 (and corresponding portions of chute extension 50) may be configured to extend generally even with (i.e. within generally the same elevated position) rear edge 46 along a portion 54 thereof between rear edge 46 and inclined area 48. Such a configuration may increase the portion of foam layer 18 that is thinner than the portions thereof adjacent flange 30, for example. Further, the angled positioning of inclined area 48 relative to, for example, baseline 52, results in a thinned area 56 of foam layer 18 that extends to a greater area than that of rear edge 46 and chute extension 50. In an example, a thinned area 56 of foam layer 18 can be considered a portion of foam layer 18 that has a thickness of less than 70% of the thickness compared to the thickness of foam layer 18 over front edge 42. In the example shown, thinned area 56 can, accordingly, extend over greater than 30% of the area of chute door 34 (and in one embodiment greater than 60%).

The reduction in thickness of foam layer 18 within thinned area 56 can reduce the amount of force needed by airbag module 8 to rupture (e.g. by ripping or tearing) foam layer 18 during airbag deployment compared with other arrangements. In the related art example of FIGS. 6 and 7, a foam layer 118 is shown having a pre-weakened line 170 along a portion of the perimeter of panel 134. This may be achieved, as in the example shown, by a lip 172 that extends above flange 130 into a narrow portion of foam layer 118. Such weakened lines 170 may be a line of thinner foam in foam layer 118 that may be reduced by, for example, 3 mm to 4 mm compared to the remaining thickness of foam layer 18 over a width of, for example, about 2 mm to 4 mm. The purpose of such a pre-weakening line 170 may simply be to provide a designated line about which foam layer 118 may rip (e.g. aligned with the edges of panel 134), without actually providing a significant reduction in the force needed by module 8 to actually achieve such ripping. This may be due to the fact that many polymeric foams, such a polyurethane, are elastic in nature. This means that the foam will initially stretch in plastic deformation up to a yield strain or a rupture strain, before ripping. The amount of strain required before yield or rupture is related to the volume of the material, which would include the areas adjacent a pre-weakened line, as those areas would absorb a portion of the opening force.

Accordingly, a reduction in thickness in the area beyond the desired rupture area, such as by the inclusion of thinned area 56, may reduce the amount of stain needed for foam layer 18 to rupture, as it reduces the overall volume adjacent the intended rupture area. Thus, the present housing 10 may provide an arrangement wherein foam layer 18 can be ripped along a portion of the perimeter of chute door 34 during airbag deployment by a force of between 5% and 50% less than other foam layers of a uniform thickness or having a pre-weakened line. In another embodiment, the reduction in force can be between about 10% and 20% less or, in another embodiment, between 15% and 25% less, or, in yet another embodiment, between 30% and 50% less. Further, by foam layer 18 tapering from a thinner area adjacent rear edge 46, an additional reduction in rupture force may be realized along the portions of foam layer 18 overlying side walls 22 and 24 of chute 16.

The reduction in ripping force for foam layer 18 achieved by the incorporation of thinned area 56 may be useful when housing 10 is assembled with an instrument panel 12 having a substrate 20 that is not itself pre-weakened in the area of chute door 34. Additionally, such a housing 10 and the accompanying thinned area 56 of foam layer 18 may result in a lower deployment force requirement or faster overall deploy times for airbag modules 8 used in an instrument panel 12 wherein substrate 20 is of leather, which may be stronger than other polymers used in instrument panels or may be difficult to effectively pre-weaken. Still further, the reduction in the volume of foam layer 18 in the area surrounding rear edge 46 may reduce the amount of foam material present and, therefore, susceptible to fragmentation. Such fragmentation may be caused by pieces of the foam material of foam layer 18 separating therefrom during ripping, which may be undesirable.

Figure 5:
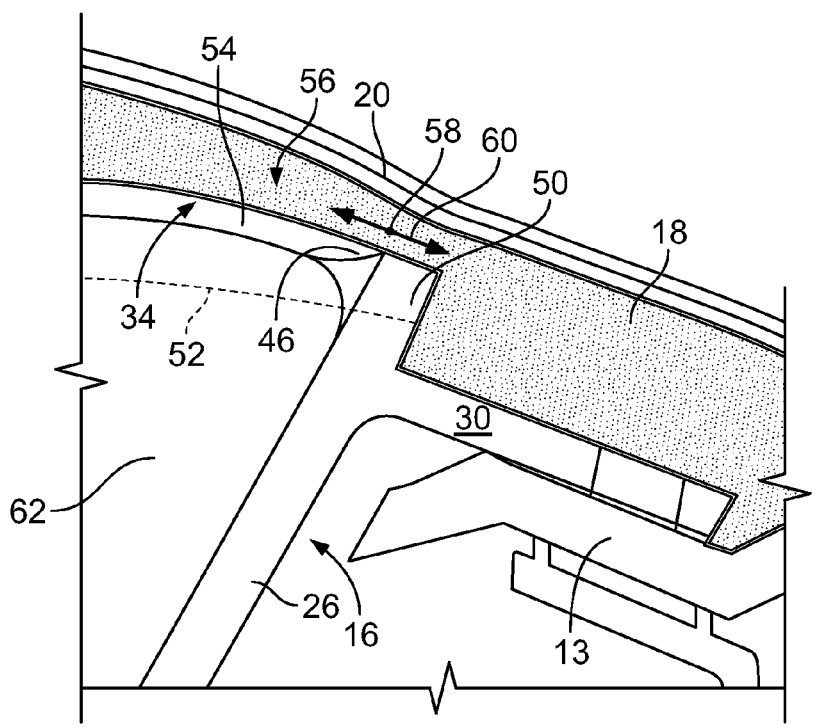
FIG. 5 is a detail view of the airbag module and instrument panel of FIG. 4 in an initial stage of airbag deployment.
Figure 6:
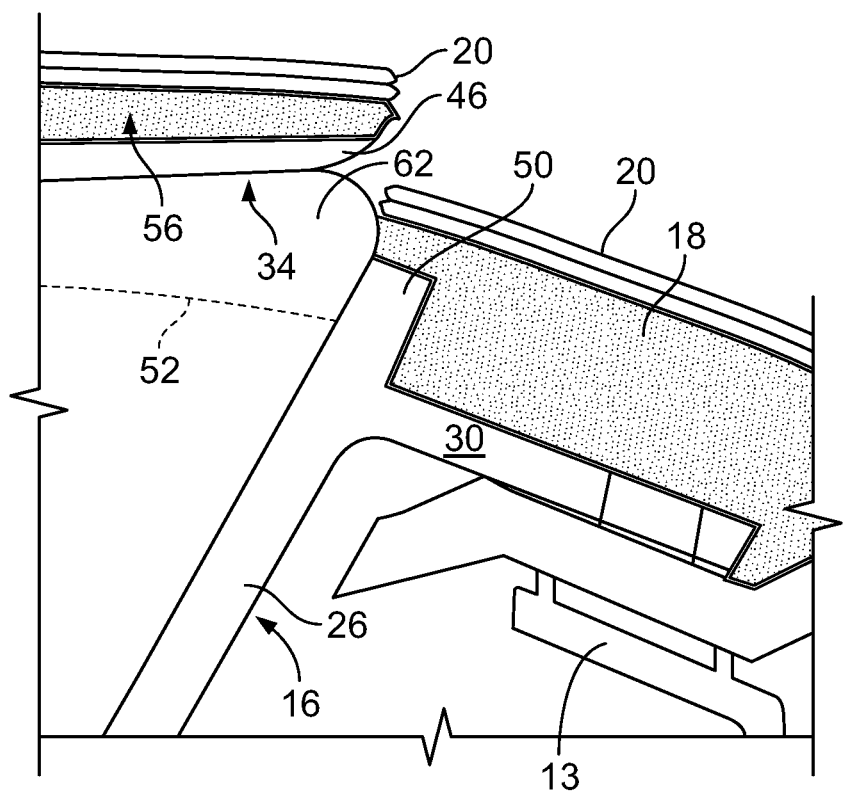
FIG. 6 is a detail view of the airbag module and instrument panel components in a subsequent airbag deployment stage.
Figure 7:
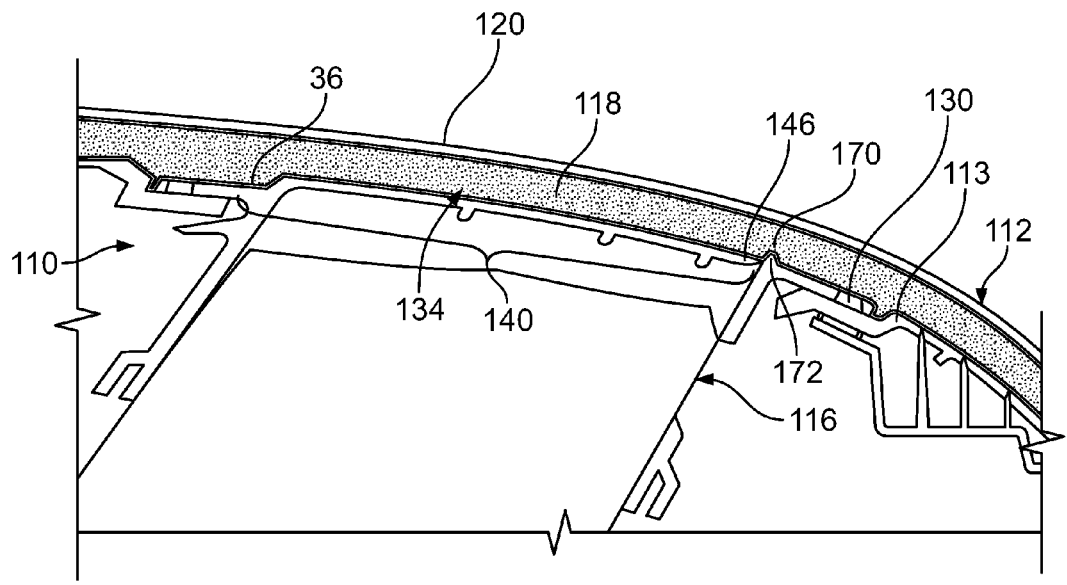
FIG. 7 is a cross-sectional perspective view of a related art airbag module.
Figure 8:
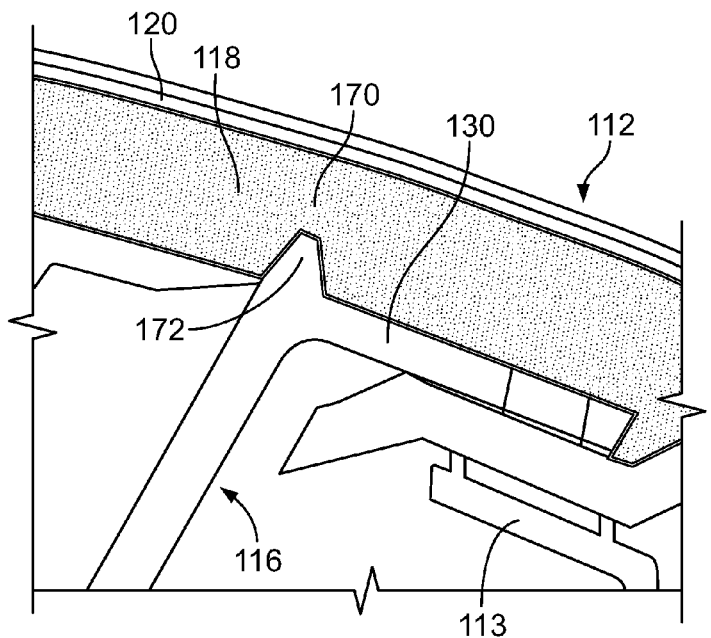
FIG. 8 is a detail view of the related art airbag module of FIG. 7.

Movement of chute door 34 during deployment of an airbag is illustrated in FIGS. 5 and 6. Upon initial deployment of the airbag 62, as shown in FIG. 5, the forces applied against the underside of chute door 34 by the deploying airbag 62 can cause chute door 34, as well as the adjacent portions of foam layer 18 and substrate 20 to flex, thereby causing strain along the portions of chute door 34 that are separated from chute 16. In the example shown, foam layer 18 experience strain along a location 58 thereof positioned between edge 46 of chute door 34 and chute extension 50, which acts through the volume of foam layer 18 extending outwardly in direction 60 from location 58. As discussed above, the reduction in such volume achieved by incorporation of thinned area 56 can reduce the force needed to stress foam layer 18, causing stretching thereof.

As shown in FIG. 6, the continued deployment of airbag 62 causes foam layer 18 to be stressed to the point of rupture causing foam layer 18, as well as substrate 20, to tear in the general area of the edges of chute door 34 (including rear edge 46). The at least partial rupture of foam layer 18 and substrate 20 under continued pressure from the deploying airbag 62 allows chute door 34 to move, at least by rotation, away from opening 40. Such movement allows airbag 62 to release toward a passenger. In another embodiment as described further above, chute door 34 can also be connected around the remaining portions between chute door 34 and the portions of walls 22, 26, and 28 by a rupturable seal or weakened portion formed integrally therebetween, as discussed above, that can also rupture during airbag deployment to allow chute door 34 to open and airbag to open toward the passenger.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations. It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An airbag assembly, comprising:
a housing, including:
a chute defining an opening; and
a panel joined with the chute at a first end and extending over the opening to a second end opposite the first end, the panel defining an inclined portion toward the second end thereof such that the second end is elevated with respect to the first end;
a substrate overlying the panel such that the second end is closer to the substrate than the first end; and
a foam layer extending from the substrate to the panel and defining a thinned portion thereof overlying the inclined portion of the panel.

2. The airbag assembly of claim 1, wherein the second end of the panel is elevated with respect to the first end by being positioned away from a reference line extending from the first end perpendicular to an adjacent portion of the chute.

3. The airbag assembly of claim 1, wherein:
the housing further includes a flange extending outwardly from the chute and surrounding the opening; and
the substrate is spaced above the flange at a generally uniform distance.

4. The airbag assembly of claim 3, wherein the second end of the panel is closer to the substrate than the flange by at least 50%.

5. The airbag assembly of claim 1, wherein the thinned portion of the foam layer extends over the panel through a distance of between about 30% and about 60% of a total distance of the panel between the second end and the first end, the tapered portion being adjacent the second end of the panel.

6. The airbag assembly of claim 1, wherein the housing further includes an extension flange extending between a portion of the chute and the second end of the panel.

7. The airbag assembly of claim 1, wherein the panel is integrally coupled with the chute through an integral hinge portion such that the panel is moveable with respect to the chute by flexing of the integral hinge portion.

8. The airbag assembly of claim 7, wherein:
the second end of the panel is disconnected from the chute; and
the panel is moveable with respect to the chute such that the flexing of the integral hinge portion facilitates movement of the second end of the panel away from the chute.

9. A vehicle instrument panel, comprising:
a substrate defining a generally planar outer surface of the instrument panel;
an airbag chute underlying the substrate with a panel coupled thereto at a first end and extending thereover to a second end;
a support, the airbag chute being coupled with the support and the substrate further overlying the support; and
a foam layer between the substrate and the panel and tapering from a first thickness over the first end of the panel to a second thickness over the second end of the panel that is less than 50% of the first thickness, the foam layer further extending between the substrate and the support substantially at the first thickness;
wherein the panel defines an inclined area adjacent the second end thereof such that the panel extends toward the substrate such that the foam layer tapers from the first thickness to the second thickness.

10. The vehicle instrument panel of claim 9, wherein the foam layer tapers from the first thickness to the second thickness over a tapering area adjacent the second end and extending through between about 30% and 60% of a distance between the first and second ends of the panel.

11. The vehicle instrument panel of claim 9, wherein:
the airbag chute and the panel are portions of an airbag housing, the airbag housing further including a flange extending outwardly from the chute and surrounding an opening thereof; and
the substrate is spaced above the flange at a generally uniform distance.

12. The vehicle instrument panel of claim 9, wherein the panel is integrally joined with the chute through an integral hinge portion such that the panel is moveable with respect to the chute by flexing of the integral hinge portion.

13. An airbag housing, comprising:
a chute including a plurality of walls and defining an opening;
a flange extending outwardly from the chute and generally surrounding the opening; and
a panel coupled with one of the walls at a first end adjacent the flange and extending over the opening to a second end opposite the first end, the panel defining an inclined section to position the second end at a distance above the flange.

14. The airbag housing of claim 13, wherein:
the first end is adjacent the flange by being positioned within about 2 mm thereof in a direction perpendicular to the opening;
and the distance of the second end above the flange is at least 5 mm.

15. The airbag housing of claim 13, wherein the inclined section of the panel extends through a distance of between about 30% and about 60% of a total distance of the panel between the second end and the first end, the inclined section being adjacent the second end of the panel.

16. The airbag housing of claim 13, wherein the housing further includes an extension flange extending between a portion of the chute and the second end of the panel.

17. The airbag housing of claim 13, wherein the panel is integrally coupled with the chute through an integral hinge portion such that the panel is moveable with respect to the chute by flexing of the integral hinge portion.

\* \* \* \* \*